C. H. SMOOT.
PRESSURE REGULATOR FOR A FLOW OF FLUID.
APPLICATION FILED OCT. 29, 1915.
1,252,623.
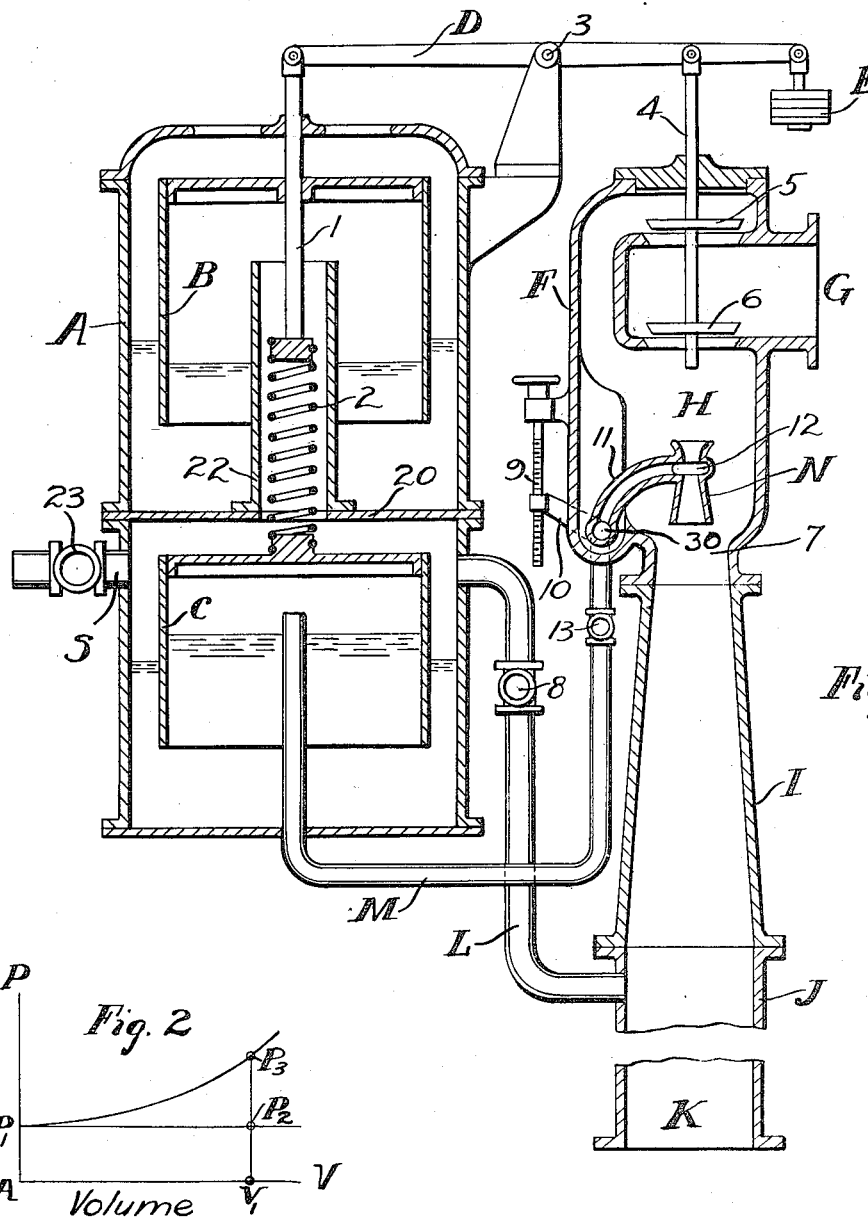
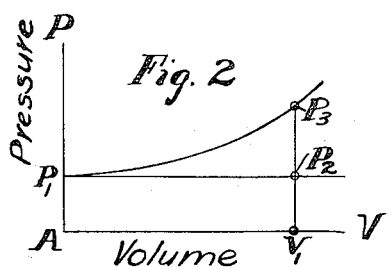
WITNESSES:
INVENTOR
Charles H. Smoot
BY
ATTORNEY

UNITED STATES PATENT OFFICE.

CHARLES H. SMOOT, OF NEW YORK, N. Y., ASSIGNOR TO RATEAU BATTU SMOOT COMPANY, OF NEW YORK, N. Y., A CORPORATION OF NEW YORK.

PRESSURE-REGULATOR FOR A FLOW OF FLUID.

1,252,623.

Specification of Letters Patent.    Patented Jan. 8, 1918.

Application filed October 29, 1915. Serial No. 58,614.

*To all whom it may concern:*

Be it known that I, CHARLES H. SMOOT, a citizen of the United States, whose post-office address is 90 West street, New York city and State, have invented certain new and useful Improvements in Pressure-Regulators for a Flow of Fluid, which improvements are fully set forth in the following specification.

My invention has for its object the pressure regulation of a flow of fluid in which it is desired to maintain within a pipe line a constant pressure at a distance remote from the regulator. The regulator has to supply fluid at this constant pressure plus a pressure which is sufficient to overcome the resistance offered by the conduit between point of regulation and the point at which the constant pressure is desired.

My regulator comprises a valve mechanism in which a weight is balanced against the fluid pressure, any departure from balance causing an opening or shutting of the valve. Opposing the closing action of the valve I add a force which is in proportion to the square of the volume passing through the system. This latter force adds to the regulator a pressure which compensates for the loss of pressure in the pipe conveying fluid from the point of regulation to the point at which a constant regulation is desired.

Figure 1 is a vertical cross section through my apparatus.

Fig. 2 is a curve showing the various pressures existing in the apparatus for different volumes passing through.

Figure 3:
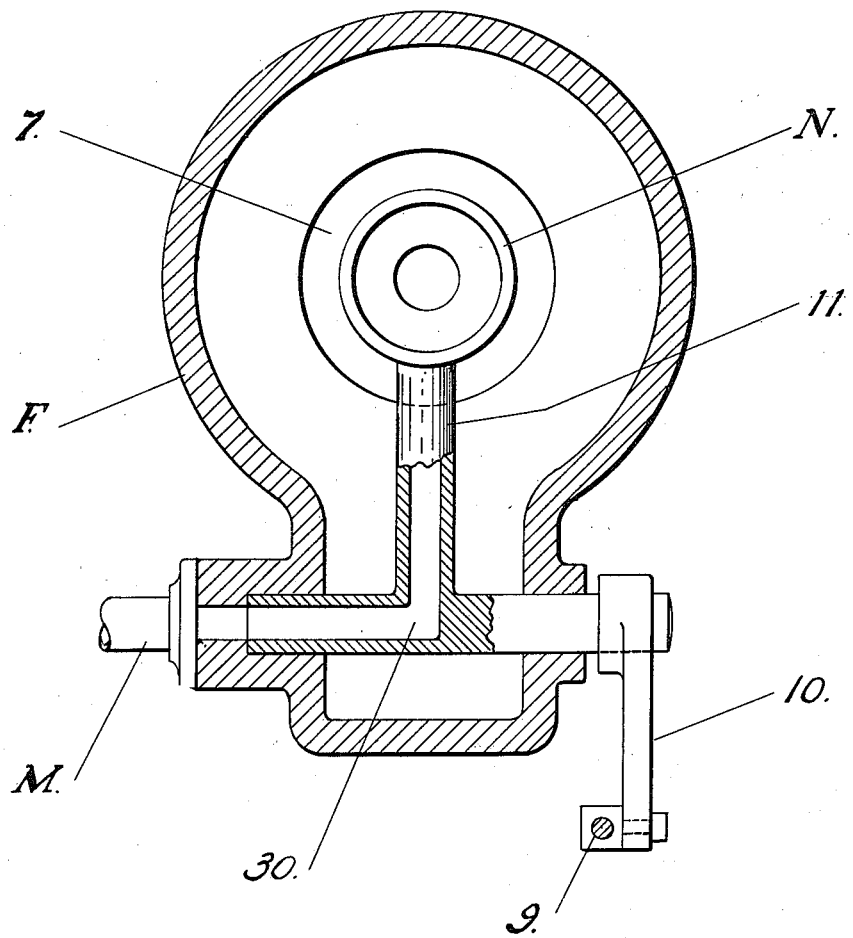
Fig. 3 is a vertical cross-section showing the connection between the conduit 11 and the right angled bend of conduit M.

In Fig. 1 A is a tank containing liquid, in which float bells B and C. 1 is a stem attached rigidly to bell B and journaled on lever D. 2 is a coil spring connecting rod 1 and bell C. Lever D is journaled on tank A by pin 3. E is a weight attached to one end of lever D, which may be adjusted to obtain regulation as desired. 4 is the valve stem to which are attached the valve disks 5 and 6 comprised within the interior of valve body F. H is the discharge port of the valve. G is the inlet for the fluid entering valve F. The valve body F is contracted to a throat at point 7, wherein the fluid passing increases its velocity with a corresponding reduction in pressure. Connected to this throat is a divergent length of pipe I, in which the velocity at throat 7 is reconverted into pressure. From pipe I fluid is led into conduit J. K is the remote point of conduit J at which constant pressure is desired. L is a pipe connecting from the rear end of conduit J to the space underneath bell B and above bell C. The connection is made through diaphragm 20 of tank A and pipe 22. In pipe L is placed an adjusting valve 8 whereby the free passage through L may be varied through slow or rapid action as desired. M is a conduit connecting under bell C the compound Venturi element N and contains hand valve 13 whereby the freedom of passage through pipe M may be adjusted as desired for rapidity of action. The compound Venturi element N comprises a converging diverging tube, the position of whose large end may be adjusted by screw 9 acting through lever arm 10 and serving to rotate the interior conduit 11 connected to throat 12 of compound Venturi element N. By means of screw 9 the outlet orifice of pressure regulating apparatus N may be placed in any desired relation to restricted portion 7 of valve body F. Conduit 11 rotates around conduit M bent at right angle 30 and allows for pressure at 12 to be exerted through 11 and M into bell C. Pipe S controlled by hand valve 23 allows, when valve 23 is opened, the pressure in bell B to be atmospheric pressure, if valve 8 of pipe L is closed.

In Fig. 2 the scale of volumes is noted by the horizontal line AV and the scale of pressure by the vertical line AP. Line $P^1$ $P^2$ presents the constant pressure for all volumes which it is desired to maintain at the point K of conduit J. The curved line $P^1$ $P^3$ represents an additional pressure measured from the horizontal line $P^1$ $P^2$ upward, which additional pressure varies as the square of the volume passing and whose value is equal to the loss of pressure in the fluid flowing through conduit J. The total pressure from line AV to line $P^1$ $P^3$ represents the pressure necessary to be maintained at the point of installation of the controlling apparatus. When the volume noted by $V^1$ is flowing the pressure represented by $V^1 V^2$ is the constant pressure to be maintained at point K. The pressure $P^2 P^3$ is the additional pressure necessary to overcome pipe friction, the total pressure maintained at point of regulation J being represented by the line $V^1 P^3$.

In Fig. 3, numbers and letters have been used corresponding with those in Fig. 1, to indicate the various parts of the apparatus. My apparatus serves to add to a constant pressure a variable pressure whose variation is in proportion to the square of the volume, which in turn is in proportion to the friction losses of the fluid in flowing through a conduit.

When a flow of fluid passes from G into H, J and K, this flow is regulated by the opening of the valve disks 5 and 6. The flow of fluid increases its velocity in the throat 7, producing a reduction of pressure and in the divergent pipe I the conversion of velocity into pressure takes place, the original pressure being almost entirely restored in pipe J. The compound Venturi element N discharges near the throat 7 and by a similar action to the larger converging diverging element produces a still further depression at throat 12. The relative position of element N as referred to throat 7 permits a wide range of adjustment for the depression at throat 12 for a given volume; thus, if the apparatus is made to discharge directly in throat 7 at a point lower than shown in the illustration a greater depression will be created at 12 than is the case for the position illustrated. Screw 9 controls the position of this compound Venturi element N.

In order to produce a constant pressure at K it is desired to add an opening force on valve disks 5 and 6, which will increase in proportion to the square of the volume passing through the pipe, thus compensating for its friction. This additional pressure element is obtained through the suction produced in throat 12, which is in proportion to the square of the volume flowing through throat 7. This depression being communicated underneath bell C, sucks down on the bell, tending to open wider valve disks 5 and 6 as the volume flowing through increases. Bell B having a closing action on the valve disks 5 and 6 under control of the pressure in pipe J, tends to regulate for constant pressure in pipe J, whose value is determined by the opposing action of weight E and suction on bell C. Thus, increasing the value of suction in bell C is equivalent to reducing the weights E and requires a greater pressure under bell B for a given closing action of valve disks 5 and 6.

For any given volume flowing through the apparatus a balance is obtained through three distinct forces; first, the fixed weight of the moving element of the apparatus, which remains sensibly constant at all times; second, the closing action of the pressure under bell B; and, third, the opening action of the suction under bell C.

The weight of the apparatus is balanced on pin 3 and by adjusting weight E the apparatus will be brought to equilibrium when there is existing a desired closing action on bell B. By manipulating weight E the necessary closing pressure can be adjusted to the value desired. In order to adjust the apparatus to serve its proper function the flow through the apparatus may be entirely stopped, thus eliminating any suction on bell C, which contributes nothing but its dead weight to the balance of the apparatus. Weight E is then adjusted against a pressure in pipe J until this pressure is brought to the desired constant pressure at the remote point K, which on the diagram of Fig. 2 is represented by the pressure $P^1$. When this condition has been reached the apparatus is in balance and the valve disks 5 and 6 are free to open and close.

It is now desired to adjust the apparatus so that for a given volume flowing through, the pressure in J is greater than the constant minimum value by an amount equal to the loss in pressure between J and K. This second adjustment is accomplished through the existence of compound Venturi element N, which is shifted until the suction under bell C increases the pressure at point J by an amount sufficient to compensate for the friction loss between points J and K. The additional effort or downward pull exerted by the suction on bell C is counterbalanced by the increased pressure under bell B which is desired for pipe J. When this adjustment has been made for a given distance between J and K it will remain sensibly constant for a long period of time, or until some change occurs in either the character of the fluid flowing or the condition of the conduit J—K.

It will be seen that my apparatus comprises, first, a constant pressure element comprising bell B and a weight system which tends to regulate for a constant pressure at point J. To this system is added automatic means for adjusting the pressure under bell B in such a way that this pressure is obliged to increase in proportion to the square of the volume flowing through the apparatus, thus causing the pressure at J to increase over its fixed minimum value by an amount which is proportional to the friction in the pipe J—K. This additional element is added through a separate bell C connected as shown in Fig. 1, valve 23 being closed and valves 8 and 13 open.

It will be noted that the difference in pressure between "H" and "12" is made equal or proportional to the loss of pressure between "K" and "J", due to the friction of passing fluid.

The variations of pressure under bell C exert an effort on lever D, which effort is transmitted by means of spring 2 and stem 1. The interposition of spring 2 between bell C and stem 1 has for effect a reduction in the rapidity of motion created by the variation of pressure in bell C. The introduction of the resilient element of spring 2 between stem 1 and bell C has the effect of preventing racing.

It will be seen from the above that I can use my regulating apparatus in conjunction with a simple Venturi element, instead of a compound Venturi element. The simple Venturi element eliminates the feature of adjustment due to the displacement of the second Venturi element as described above. A Venturi element is an apparatus adapted to create a reduction in pressure corresponding to an increase of volume. The compound Venturi element acts in the same way and in addition, the process of compounding multiplies the pressure variation.

Having thus described my invention, I claim as new:—

1. In a pressure regulator for a flow of fluid adapted to maintain a predetermined constant pressure at a point of the flow of fluid distant from said regulator, a variable orifice interposed in the path of the fluid, a Venturi element, a compound Venturi element, means to adjust the relative positions of the Venturi element and the compound Venturi element, means to control the variable orifice operated by the pressure of the fluid after said fluid has passed through the Venturi element and means to counteract upon the first controlling means operated by pressure derived from fluid passing through the throat of the compound Venturi element.

2. In a pressure regulator for a flow of fluid adapted to maintain a predetermined constant pressure at a point of flow of fluid distant from said regulator, a variable orifice interposed in the path of the fluid, a Venturi element receiving the fluid after it has passed through the variable orifice, a compound Venturi element located in the Venturi element, two pressure operated elements operated respectively by the pressures of the fluid at the throat of the compound Venturi element and at the discharge of the Venturi element.

3. In a pressure regulator for a flow of fluid adapted to maintain a predetermined constant pressure at a point of flow of fluid distant from said regulator, a variable orifice interposed in the path of the fluid, a Venturi element receiving the fluid after it has passed through the variable orifice, a compound Venturi element located in Venturi element, two pressure operated elements operated respectively by the pressures of the fluid at the throat of the compound Venturi element and at the discharge of the Venturi element, and resilient means interconnecting the two pressure operated elements.

4. In a pressure regulator for a flow of fluid adapted to maintain a predetermined constant pressure at a point of flow of fluid distant from said regulator, a variable orifice interposed in the fluid path, a Venturi element adapted to receive the fluid after it has passed through the variable orifice, a compound Venturi element and adjustable means adapted to vary the relative positions of the Venturi element and the compound Venturi element.

5. In a pressure regulator for a flow of fluid adapted to maintain a predetermined constant pressure at a point of flow of fluid distant from said regulator, a variable orifice interposed in the fluid path, a Venturi element, a compound Venturi element, means responsive to fluid pressure having a closing effect upon the variable orifice for increased pressure and means responsive to fluid pressure at the throat of the compound Venturi meter opposing the action of the first means.

6. In a pressure regulator for a flow of fluid adapted to maintain a predetermined constant pressure at a point of flow of fluid distant from said regulator, a variable orifice interposed in the fluid path, a Venturi element, a compound Venturi element, means responsive to fluid pressure having a closing effect upon the variable orifice for increased pressure, means responsive to fluid pressure at the throat of the compound Venturi meter opposing the action of the first means and resilient means interconnecting the first and second pressure actuated means.

7. In a pressure regulator for a flow of fluid, a variable orifice interposed in the fluid path and discharging into a Venturi element, a pressure responsive device actuated by the pressure of the fluid at a point of the flow having a relatively low velocity, a second pressure responsive device actuated by the fluid pressure prevailing in the restricted portion or throat of the Venturi element—this is to say at a point of relatively high velocity—and opposing the action of the first pressure responsive device, a resilient means interconnecting said pressure responsive devices and means to control the size of the variable orifice operated by both of said pressure responsive devices.

8. In a pressure regulator for a flow of fluid, a variable orifice interposed in the fluid path and discharging into a Venturi element, a pressure responsive device actuated by the pressure of the fluid after it has passed the restricted portion or throat of the Venturi element, a second pressure responsive device actuated by the fluid pressure prevailing in the restricted portion or throat of the Venturi element and opposing the action of the first pressure responsive device and means to control the size of the variable orifice operated by both of the pressure responsive devices.

9. In a pressure regulator for a flow of fluid, a variable orifice interposed in the fluid path and discharging into a Venturi element, a pressure responsive device actuated by the pressure of the fluid after it has passed the restricted portion or throat of the Venturi element, a second pressure responsive device actuated by the fluid pressure prevailing in the restricted portion or throat of the Venturi element and opposing the action of the first pressure responsive device, and resilient means interconnecting both of said pressure responsive devices and means to control the size of the variable orifice operated by both of said pressure responsive devices.

10. In a pressure regulator for a flow of fluid, a variable orifice interposed in the fluid path, a plurality of pressure responsive means operated by the fluid pressure at different points of its flow and controlling the size of the variable orifice, and elastic means adapted to interconnect the plurality of pressure responsive means.

In witness whereof I have hereunto subscribed my name this 28th day of October 1915.

CHARLES H. SMOOT.

Witnesses:
L. BATEN,
ALFRED E. SMITH.